(12) United States Patent
Vasanawala et al.

(10) Patent No.: US 12,387,394 B2
(45) Date of Patent: Aug. 12, 2025

(54) METHOD FOR IMPROVING HIGH FREQUENCY IMAGE FEATURES AND DETAILS IN DEEP LEARNING MRI RECONSTRUCTIONS

(71) Applicant: The Board of Trustees of the Leland Stanford Junior University, Stanford, CA (US)

(72) Inventors: Shreyas S. Vasanawala, Stanford, CA (US); Kanghyun Ryu, Palo Alto, CA (US); Cagan Alkan, Redwood City, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 333 days.

(21) Appl. No.: 18/202,592

(22) Filed: May 26, 2023

(65) Prior Publication Data

US 2023/0386101 A1 Nov. 30, 2023

Related U.S. Application Data

(60) Provisional application No. 63/346,280, filed on May 26, 2022.

(51) Int. Cl.
*G06T 11/00* (2006.01)
*G06T 7/00* (2017.01)

(52) U.S. Cl.
CPC .......... *G06T 11/006* (2013.01); *G06T 7/0012* (2013.01); *G06T 11/005* (2013.01);
(Continued)

(58) Field of Classification Search
None
See application file for complete search history.

(56) References Cited

U.S. PATENT DOCUMENTS

2017/0336488 A1* 11/2017 Pipe ..................... G01R 33/482
2020/0249300 A1* 8/2020 Sandino ................ G06N 3/084
(Continued)

OTHER PUBLICATIONS

Resolving fold-over artefacts for Reduced Field-of-View Parallel Imaging with Cartesian Sampling Sen Jia et al Dec. 17, 2022 (Year: 2020).*

(Continued)

*Primary Examiner* — Nancy Bitar
(74) *Attorney, Agent, or Firm* — LUMEN PATENT FIRM

(57) ABSTRACT

A method for magnetic resonance imaging (MRI) includes acquiring under-sampled k-space measurements from an MRI apparatus using multiple receiver coils; reconstructing an MRI image from the under-sampled k-space measurements and coil sensitivity maps using an unrolled neural network; generating reconstructed multi-coil k-space data from the MRI image by multiplying the MRI image by the coil sensitivity maps followed by performing a Fourier transform; estimating a k-space null-space convolutional kernel from fully-sampled k-space measurements in auto-calibration signal lines of the under-sampled k-space measurements; solving a convex optimization problem to produce refined k-space data from the k-space null-space kernel, the under-sampled k-space measurements, and the reconstructed multi-coil k-space data; and producing a refined MRI image from the refined k-space data by performing an inverse Fourier transform followed by a coil combination using the coil sensitivity maps.

3 Claims, 5 Drawing Sheets

(52) U.S. Cl.
CPC .............. *G06T 2207/10088* (2013.01); *G06T 2207/20056* (2013.01); *G06T 2207/20081* (2013.01); *G06T 2207/20084* (2013.01); *G06T 2207/30016* (2013.01); *G06T 2210/41* (2013.01)

(56) References Cited

U.S. PATENT DOCUMENTS

| | | | | |
|---|---|---|---|---|
| 2022/0244333 | A1* | 8/2022 | Zhao | G01R 33/543 |
| 2023/0337932 | A1* | 10/2023 | Benkert | G06T 5/70 |
| 2024/0288526 | A1* | 8/2024 | Wu | G01R 33/5608 |
| 2024/0361411 | A1* | 10/2024 | Zhang | G01R 33/5611 |

OTHER PUBLICATIONS

Ryu, et al. "Improving high frequency image features of deep learning reconstructions via k-space refinement with null-space kernel." Magn Reson Med. Apr. 15, 2022; 88( 3): 1263-1272. doi:10.1002/mrm.29261.

Ryu, et al. "K-space refinement in deep learning MR reconstruction via regularizing scan specific SPIRIT-based self consistency." 2021 IEEE/CVF Int'l Conf. Computer Vision Workshops (ICCVW) (2021): 3991-4000.

* cited by examiner

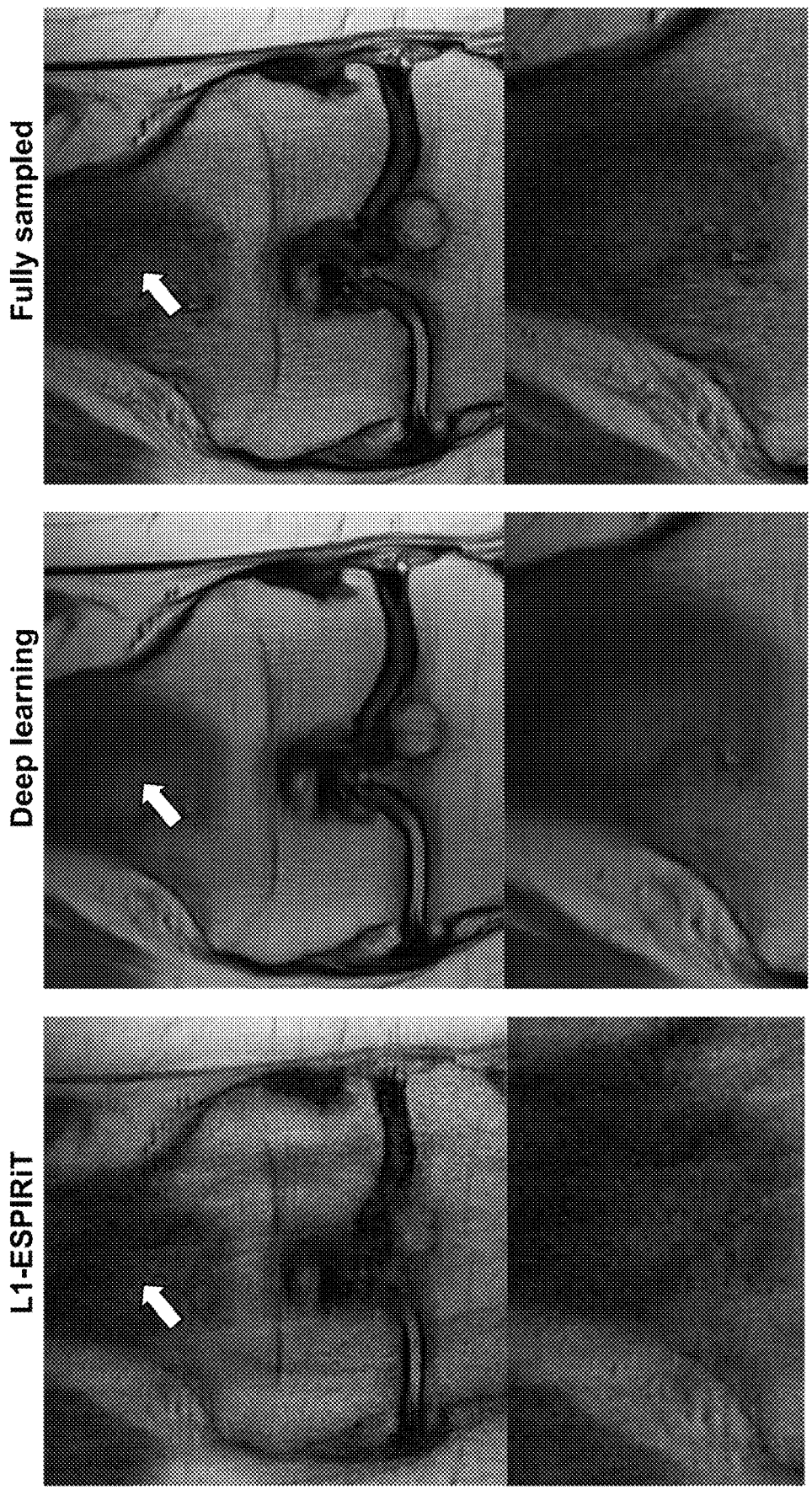

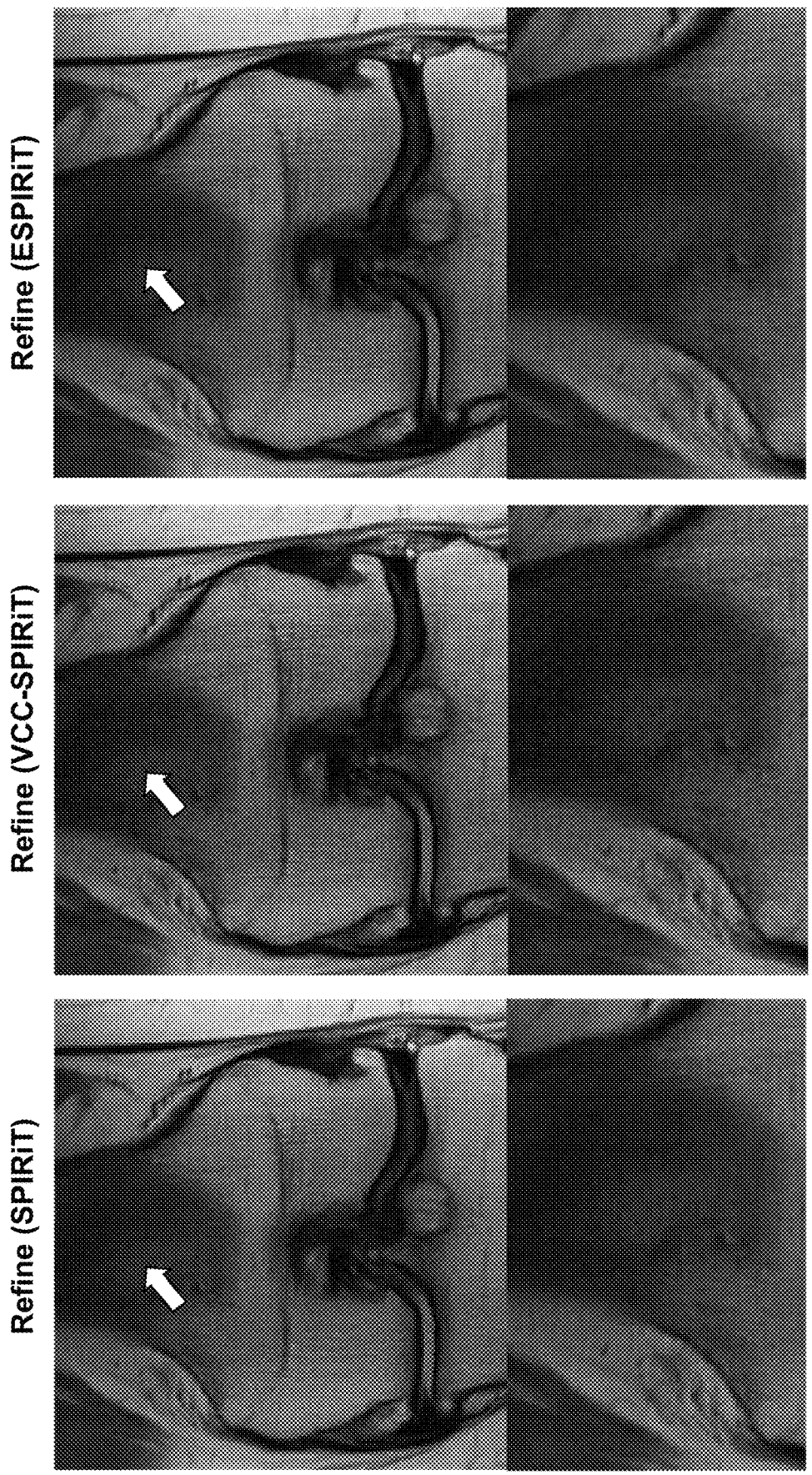
*Fig. 4D*  *Fig. 4E*  *Fig. 4F*

METHOD FOR IMPROVING HIGH FREQUENCY IMAGE FEATURES AND DETAILS IN DEEP LEARNING MRI RECONSTRUCTIONS

CROSS-REFERENCE TO RELATED APPLICATIONS

This application claims priority from U.S. Provisional Patent Application 63/346,280 filed May 26, 2022, which is incorporated herein by reference.

STATEMENT OF FEDERALLY SPONSORED RESEARCH

This invention was made with Government support under contract EB019241 awarded by the National Institutes of Health, and under contract EB009690 awarded by the National Institutes of Health. The Government has certain rights in the invention.

FIELD OF THE INVENTION

The present invention relates generally to diagnostic imaging. More specifically, it relates to techniques for magnetic resonance (MR) image reconstruction using deep learning.

BACKGROUND OF THE INVENTION

In recent years, deep learning (DL) methods for multi-coil under-sampled MR reconstruction have garnered considerable attention, with the goal of reconstructing high-quality images from a set of under-sampled k-space measurements. Unrolled neural networks (UNNs), which are a DL extension of iterative reconstructions, have gained popularity and demonstrated superior performance to conventional reconstructions based on parallel imaging and compressed sensing (PI-CS). Variational Networks (VN) and Model-based Deep Learning (MoDL) are two representative UNNs.

While UNNs significantly improved reconstructed image quality when compared to standard compressed sensing (CS) methods, one of their major drawbacks is over-smoothing, which results in the loss of high-frequency details. UNNs are typically trained using loss functions such as mean squared error (MSE) or mean absolute error (MAE). They are known, however, to be insufficiently representative of the human visual system and to be blind to critical local features such as minute details, resulting in blurry images. As a result, many researchers are currently interested in improving high-frequency visual details in DL reconstruction. The recovery of high-frequency details has primarily been studied in the context of generative adversarial networks (GAN). However, when used for MR reconstruction these approaches have several drawbacks: they are sensitive to parameters difficult to train and can produce unexpected hallucinations of artificial structures.

SUMMARY OF THE INVENTION

The present inventors have created a new technique for refining DL-based image reconstructions to improve the high-frequency details in reconstructed images. After DL-based reconstruction, this technique can be conveniently inserted in as a stand-alone post-processing stage.

There have been several studies that explored feature losses with generative adversarial networks (GANs), which are notable for generating high-quality realistic images. However, GAN-based methods are shown to have the possibility of creating hallucinations of artificial structures and increase ambiguity in the reconstructed results. Compared with GAN-based methods, the present technique does not require additional training or retraining, and the refinement quality does not depend on training data and does not create hallucination or artificial structure.

The method first estimates a kernel from the auto-calibration lines of the input k-space using a calibration method, then uses the kernel to refine the Fourier domain projection (k-space domain) of the DL reconstructed image. Optionally, the number of coils can be increased using virtual coil augmentations to further improve refinement, along with coil compression to reduce the number coil substantially to maintain computational efficacy.

This technique can be used to refine the image quality and texture of DL-based undersampled MR reconstruction. The technique visually and quantitatively increases the high-frequency features of DL reconstructions for the three datasets. It generates clearer images and better maintains minute features such as microvascular structures and tissue borders. The technique is successful in improving high-frequency image details (SSIM, GMSD) without sacrificing overall image error (PSNR), as shown by the IQMs. Due to the more defined tissue boundaries, this approach may have benefits in clinical situations, such as the identification of detailed ligaments and microscopic structures inside the joint.

This technique may be applied to various types of MR imaging including 2D imaging, 3D imaging, multi-contrast imaging, and cine imaging. Generally, this technique can be applied as a post-processing step after any type of DL-based multi-coil MRI reconstruction method to refine textures in the reconstructed image.

In one aspect, the invention provides a method for magnetic resonance imaging (MRI) comprising: acquiring under-sampled k-space measurements from an MRI apparatus using multiple receiver coils; reconstructing an MRI image from the under-sampled k-space measurements and coil sensitivity maps using an unrolled neural network; generating reconstructed multi-coil k-space data from the MRI image by multiplying the MRI image by the coil sensitivity maps followed by performing a Fourier transform; estimating a k-space null-space convolutional kernel from fully-sampled k-space measurements in autocalibration signal lines of the under-sampled k-space measurements; solving a convex optimization problem to produce refined k-space data from the k-space null-space kernel, the under-sampled k-space measurements, and the reconstructed multi-coil k-space data; producing a refined MRI image from the refined k-space data by performing an inverse Fourier transform followed by a coil combination using the coil sensitivity maps.

Preferably, estimating the k-space null-space kernel comprises performing a virtual coil augmentation, coil compression, and solving a constrained optimization problem. Preferably, solving the convex optimization problem to produce the refined k-space data from the k-space null-space kernel comprises performing a conjugate gradient (CG) algorithm.

BRIEF DESCRIPTION OF THE DRAWINGS

FIG. 4A-4F show L1-ESPIRiT (FIG. 4A), Deep Learning reconstruction using MoDL (FIG. 4B), and fully sampled reference image (FIG. 4C) as compared to the results of image refinement with different null-space kernels (FIG. 4D-4F). The images are retrospectively under-sampled with R=6.

DETAILED DESCRIPTION OF THE INVENTION

Deep Learning based MRI image reconstruction from under-sampled measurements using unrolled neural networks has enabled accelerated MRI. These DL-based reconstructions, however, often have a loss of high-frequency details and textures. To address this problem, an image refinement method is described that uses null-space kernel to refine k-space and improve image details and textures. The method constrains the output of the DL to comply to the linear neighborhood relationship calibrated in the autocalibration lines. The technique visually reduces the structural error in the k-space domain, and enhances the homogeneity of the k-space intensity. Consequently, the reconstructed image is sharper and has enhanced details and textures. The method is also successful in improving high-frequency image details (SSIM, GMSD) without sacrificing overall image error (PSNR).

The present technique provides a strategy for refining DL-based reconstructions that differs from prior approaches. Rather than focusing on a neural network-based training technique, it focuses on the Fourier domain projection (k-space domain) of the DL reconstruction and uses null-space kernel based techniques to improve this k-space. The method focuses on rectifying the k-space, which we discovered is effective for recovering high frequency features and textures.

Deep Learning Methods for MRI Reconstruction

Figure 1:
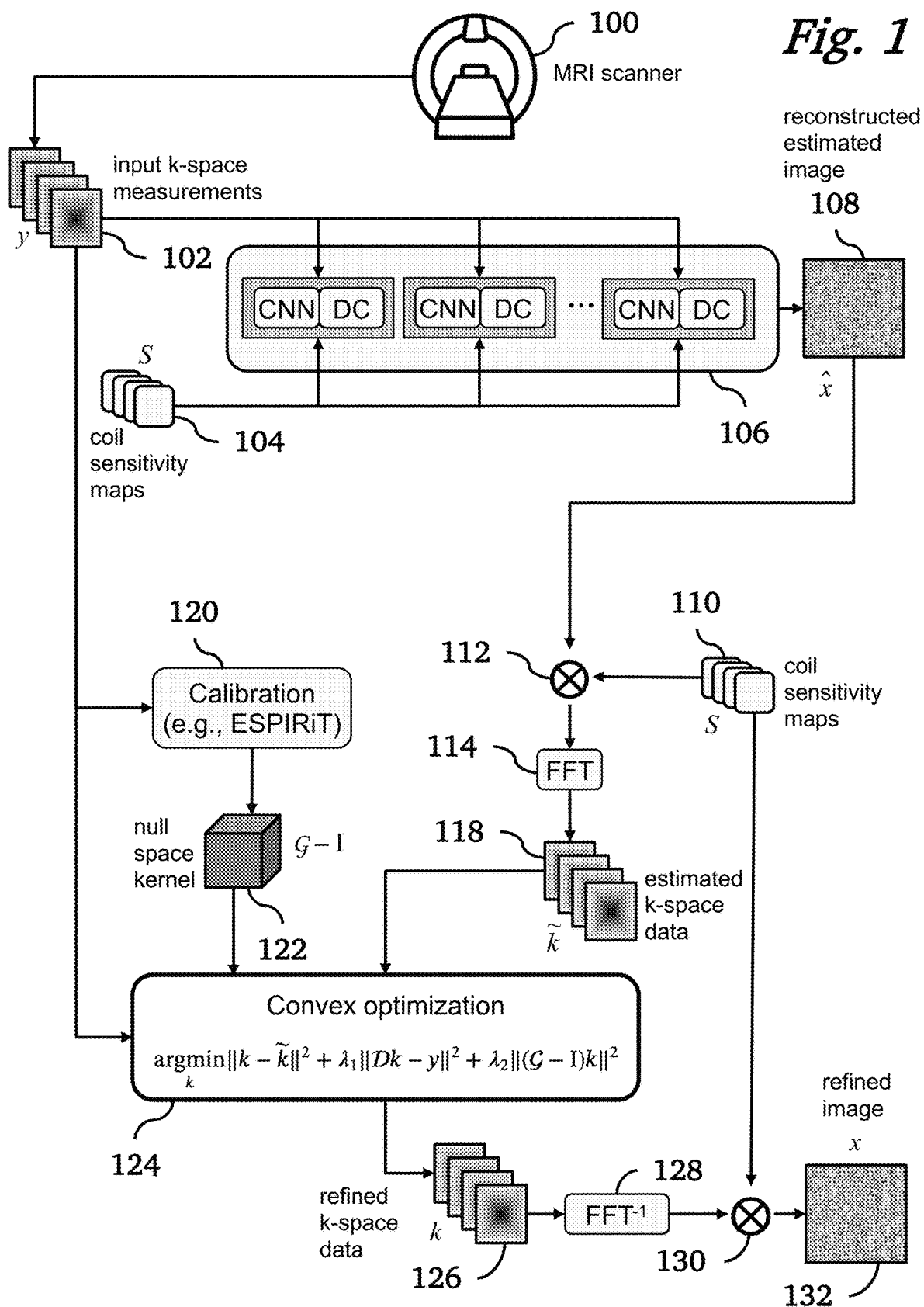
FIG. 1 shows a processing pipeline illustrating an embodiment of the present invention. The DL-estimated k-space is derived by projecting the DL-reconstructed image to multi-coil k-space. With three inputs (DL-estimated k-space, input k-space, a null-space kernel obtained from the ACS line), the k-space is refined to provide enhanced texture and details.

Embodiments of the present invention provide a post-processing image refinement technique that follows conventional DL-based MRI reconstruction approaches. FIG. 1 shows in its upper portion a DL-based MRI image reconstruction using a UNN. Using multiple receiver coils, an MRI scanner 100 acquires measurements 102 in the k-space of a subject's anatomy. Each coil acquires k-space signals that are modulated by the coil's sensitivity. The acquired signal for the i-th coil can be denoted by the formula, $$k_i = \mathcal{DF}(S_i x) + \epsilon, \qquad (1)$$

where $\mathcal{D}$ is a binary mask operator for selecting acquired k-space positions, $\mathcal{F}$ is the Fourier transform operator, $S_i$ is the i-th coil's complex-valued sensitivity map 104. The k-space measurements 102 and coil sensitivity maps 104 are input to multiple stages of the UNN 106 which outputs a reconstructed image 108.

By incorporating an additional regularization function, classical compressed sensing (CS) enables the reconstruction of under-sampled measurements. This can be denoted by the following minimization problem:

$$\hat{x} = \arg\min_x \sum_{i=1}^{n_c} \|\mathcal{DF}(S_i x) - k_i\|_2^2 + \lambda \Psi(x) \qquad (2)$$

$$= \arg\min_x \frac{1}{2}\|Ax - \tilde{k}\|_2^2 + \lambda \Psi(x)$$

where $\Psi$ is a predefined regularization function, A is a linear operator composed of sensitivity map projection, Fourier transform, and discrete sampling. $\tilde{k}$ is a vector representing the obtained under-sampled k-space. This minimization seeks to reconstruct an image x that is the closest match to the measured data $\tilde{k}$ and minimizes the regularization function $\Psi$.

A UNN 106 goes beyond CS by extending this regularization function to be data-adaptive and highly nonlinear. In UNN, the regularization function $\Psi$ is designed as a trainable convolutional neural network (CNN), and the iterative reconstruction algorithms to solve the optimization problem are unrolled into a deep neural network.

During the training stage, the CNN's parameters are updated using gradient descent with respect to the computed loss using the fully sampled reference.

Calibration-Based Parallel MRI Recovery in K-Space Domain

To further understand the basic idea of the present refinement method, it is helpful to revisit some well-established parallel-MRI reconstruction methods applied in the k-space domain. These methods can reconstruct the image from under-sampled k-space by ensuring the self-neighborhood-consistency of k-space leveraging correlated information from multiple coils and neighboring points. A point in k-space data can be effectively expressed as a linear combination of multi-coil signals and neighboring points. Several well-known approaches for reconstructing MRI using this information include GRAPPA, SPIRiT, ESPIRiT, LORAKS, and ALOHA.

From a tiny portion of the completely sampled k-space center, which is also called the autocalibration signal (ACS), calibration-based parallel MRI approaches derive a linear relationship between adjacent and inter-coil k-space data. This relationship then is extended to reconstruct missing lines.

In an operator form, this can be expressed as:

$$k = \mathcal{G} k, \qquad (3)$$

where k is a vector of multi-coil k-space and $\mathcal{G}$ denotes a linear convolutional kernel operator with the linear relationship mentioned previously. Then, the reconstruction problem can be performed by solving an optimization problem given by, $$\text{minimize} \|(\mathcal{G} - I)k\|^2$$

$$s.t. \|\mathcal{D}k - y\|^2 \le \epsilon, \qquad (4)$$

where the minimization seeks for reconstructed k-space k that matches this optimization problem. Here, y is the acquired k-space data, and $\mathcal{D}$ is a mask operator that picks the acquired locations. The kernel ($\mathcal{G}$−I) is often referred to as the k-space null-space kernel since it nullifies the k-space.

One optimization approach for solving this minimization problem is to reformulate and solve it in the unconstrained Lagrangian form:

$$\arg\min_{k} \|(\mathcal{G} - I)k\|^2 + \lambda \|\mathcal{D}k - y\|^2 \quad (5)$$

Additionally, an extra penalty term $\mathcal{R}(\cdot)$ can be used to further regularize the problem as:

$$\arg\min_{k} \|(\mathcal{G} - I)k\|^2 + \lambda_1 \|\mathcal{D}k - y\|^2 + \lambda_2 \mathcal{R}(k) \quad (6)$$

For example, in the $\ell_1$-SPIRiT model, the extra penalty term is the $\ell_1$ wavelet operator, which prefers solutions that are sparse in the wavelet domain.

Refinement Method

As shown in the lower portion of FIG. 1, the present image refinement method is carried out after the DL reconstruction (shown in the upper portion) is complete. It is performed independent of the DL reconstruction. The image refinement is performed by a convex optimization 124 that takes three inputs: the acquired under-sampled k-space measurements 102, an ACS-derived null-space kernel 122 derived from the k-space measurements 102, and DL-reconstructed k-space data 118 derived from the DL-reconstructed image 108 and coil sensitivity maps 110.

To begin, by multiplying 112 the DL reconstructed image 108 by the sensitivity maps 110 and performing the Fourier transform 114, the DL estimated multi-coil k-space 118 is obtained. Second, using calibration methods 120 like as SPIRiT, ESPIRiT, and others, the null-space kernel 122 can be obtained from the fully-sampled ACS lines. Additionally, the calibration can be improved by using virtual coil conjugate (VCC) augmentation to further constrain conjugate symmetry. This augmentation is equivalent to phase constrained reconstruction in image domain.

The image refinement is performed by performing a convex optimization 124, specifically, finding the k that minimizes an expression involving three terms:

$$\arg\min_{k} \|k - \tilde{k}\|^2 + \lambda_1 \|\mathcal{D}k - y\|^2 + \lambda_2 \|(\mathcal{G} - I)k\|^2 \quad (7)$$

where $\tilde{k}$ is the DL estimated multi-coil k-space 118, $\mathcal{D}$ is an operator that selects acquired locations, y is the acquired under-sampled k-space 102, $\mathcal{G}$−I is the null-space kernel 122. The coefficients $\lambda_1$, $\lambda_2$ are configurable weighting parameters that allow us to choose the desired image quality. The appropriate selection of parameters will depend on three main factors: the uncertainty of DL reconstruction, accuracy of the null-space kernel, and the signal to noise ratio or accuracy of the acquired k-space. The convex optimization 124 can be solved by performing conjugate gradient (CG) algorithm. The solution k that minimizes this expression is the refined multi-coil k-space 126 and is then transformed to a refined MR image 132 by performing inverse Fourier Transform 128 and coil combination 130 using the sensitivity maps 110.

The goal of the refinement is to further constrain the DL reconstruction to satisfy the previously discussed null-space constraint in k-space. We observed that when values of $\lambda_2$ that are too small the image converges to the original DL result, and values of $\lambda_2$ that are too large produce noisy or aliased output as it converges to a parallel imaging reconstruction. Here for simplicity, we apply identical regularization settings for $\lambda_1$ and $\lambda_2$, resulting in $\lambda=\lambda_1=\lambda_2$. Likewise for R=4 cases we set $\lambda=5$, and $\lambda=10$ for R=6, where R is the parallel imaging acceleration factor.

Experiments

The following experimental tests were designed to validate the refinement technique under a variety of conditions (i.e., dataset, unrolled neural networks, and under-sampling scheme):
1. Datasets:
   a) Coronal knee with proton density weighting: $N_{train}=108$, $N_{test}=32$,
   b) Coronal knee with proton density weighted and fat saturation: $N_{train}=112$, $N_{test}=26$,
   c) Axial brain T1 with contrast agent: $N_{train}=212$, $N_{test}=43.3$.
2. DL reconstructions: MoDL, Variational Network
3. Undersampling scheme: Equispaced under-sampling with R=4, 6, and nACS=21.

As shown above, three subsets from publicly available datasets—two knee datasets and one brain dataset—from the multicoil track of the fast MRI dataset were used (27,28). Each dataset was separately trained and tested with $N_{train}$ and $N_{test}$ denoting the number of subjects used for training and testing, respectively.

The DL reconstruction was performed using two unrolled neural networks—MoDL and VN. To ensure a fair comparison, we replaced convolutional networks with U-Nets in both MoDL and VN. In both networks, ESPIRiT-computed sensitivity maps were used. Due to memory constraints on the GPU, 12 unrolled blocks were used for VN, 10 unrolled blocks for MoDL, and per-pixel MAE was used for the loss function.

We under-sampled the dataset retrospectively using an equi-spaced sampling pattern with net acceleration factors of 4 and 6. (with 21 fully sampled ACS lines). We show resultant images from the MoDL network for the sake of readability. Results from VN are analogous to MoDL.

The refinement process is performed after DL reconstruction. Firstly, image reconstructed with DL was projected onto the multi-coil k-space to produce DL-estimated k-space. Secondly, the null-space kernel is derived in the ACS lines of the under-sampled k-space with the methods with following parameters:
1. SPIRIT: kernel size=5×5, calibration region=24×24, Tikhonov regularization=0.001,
2. VC C-SPIRIT: kernel size=5×5, calibration region=24× 24, Tikhonov regularization=0.001.
3. ESPIRiT: SURE-calibrated algorithm in BART toolbox.

Finally, with the three inputs—DL-estimated k-space, under-sampled k-space, and the calibrated null-space kernel—minimization of Eq. 7 outputs refined k-space, which are then reconstructed to an image with inverse Fourier Transform and coil combination using the sensitivity maps.

Evaluation Metrics

To evaluate the overall quality of the reconstructed images, widely used general image quality metrics (IQMs) such as PSNR (Peak Signal to Noise Ratio) and SSIM (Structural Similarity Index) were assessed. Results of DL and the refinement technique for each slice in the test-set were evaluated and compared. Specifically, magnitude images were normalized between 0 and 1 and IQSMs were computed for each slice. PSNR reflects the overall pixel-wise errors of the image, and SSIM shows the local image similarity with respect to the fully sampled reference.

One metrics was additionally assessed to assess the effect of the refinement technique on high-frequency image details: Gradient Magnitude Standard Deviation (GMSD). The GMSD metric represents the standard deviation of the two images' gradient magnitude similarity maps.

Results

Effect of Refinement on k-Space

Figure 2A:
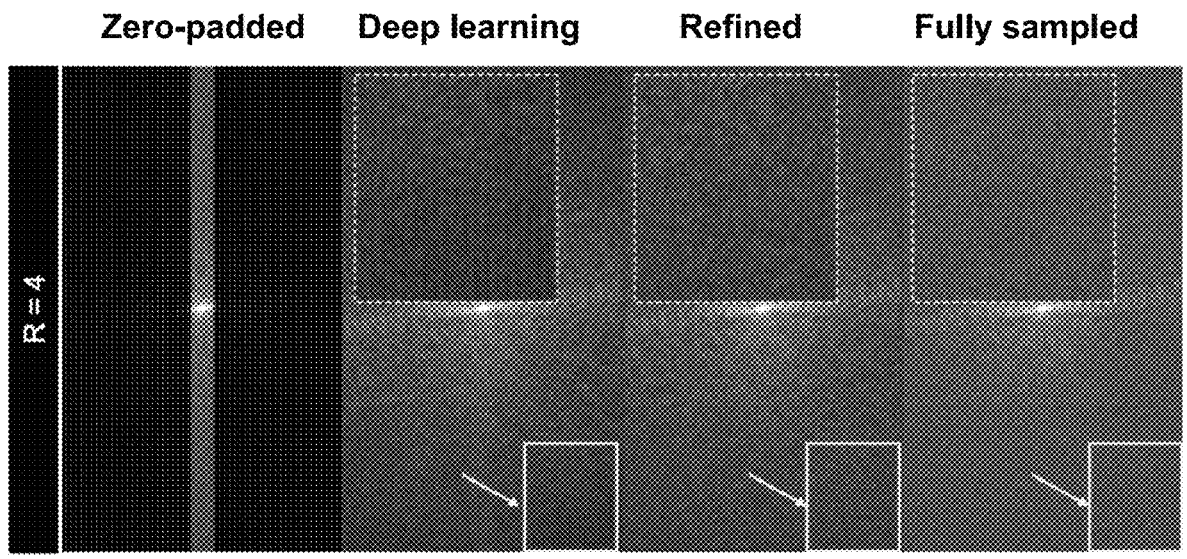
FIG. 2A, 2B show visualization of the magnitude of k-spaces (1st coil) in log-scale. The magnified views of the corresponding box are also shown. For R=4, the refinement eliminates discontinuities in the DL-estimated k-space and corrects underestimated k-space values. For R=6, it broadens the k-space lines from the acquired k-space lines to compensate for the neighborhood's underestimated k-space.
Figure 2B:
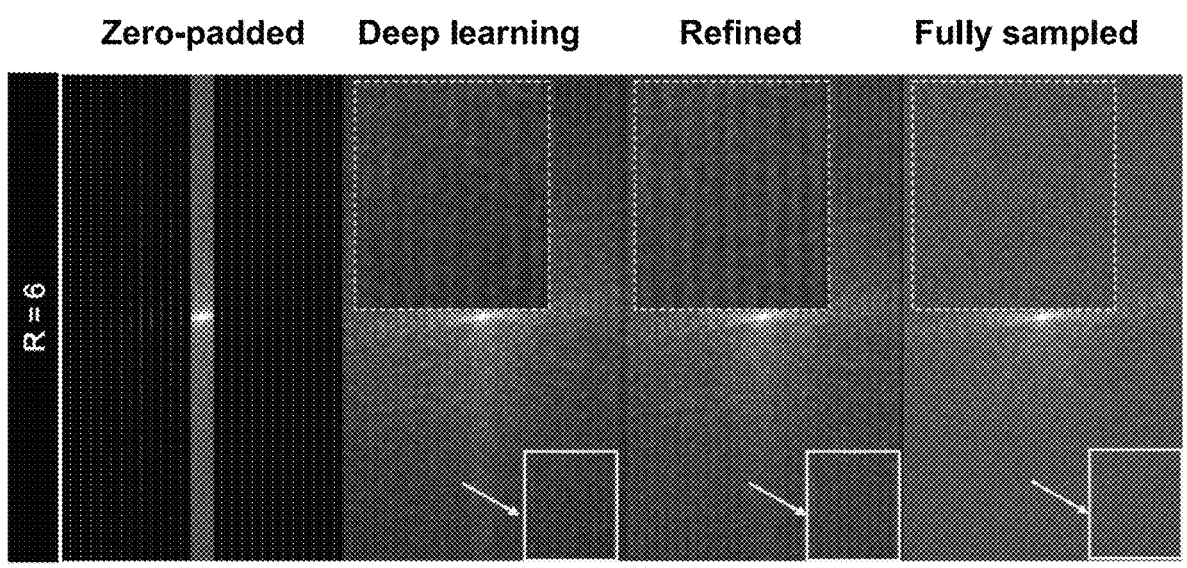

FIG. 2A, 2B illustrate the k-spaces of zero-filled reconstruction, DL reconstruction (MoDL), our refinement technique, and the fully sampled reference. The magnitude intensities of the k-spaces are presented in a log scale for better visualization. In this figure, k-spaces from DL reconstruction (2nd column) generate stripe-like inhomogeneous intensities that are more noticeable in the periphery area (dotted box). As shown in FIG. 2A for R=4, the suggested refinement enhances homogeneity which is closer to the fully sampled reference. As shown in FIG. 2B for R=6, the refinement compensates for an underestimation in the vicinity of the obtained k-space lines, hence expanding the brighter k-space lines shown by the dotted box. The refined k-space produces lower signal after convolving with a null-space kernel, implying that the k-space better complies with self-neighborhood consistency.

combination with the sensitivity maps. It can be observed that the refinement method produces crisper images with enhanced textures compared to the reconstruction from the MoDL. Moreover, as can be observed, the refined image results in a more equally distributed error distribution and a reduction of high error in specific areas of the image (marked with arrows). Additional results of refinement technique using different acceleration factors (R=2,4,6) for the three datasets show that refinement enhances finer image quality.

Comparison of Refinement Using Different Null-Space Calibration Methods

The results of various refining methods using null-space kernels from the three calibration methods—SPIRiT, VCC-SPIRiT, and ESPIRiT—are shown in FIG. 4A-4F. To illustrate the comparison, we demonstrate iterative reconstruction using parallel imaging and compressed sensing ($L_1$-ESPIRiT), DL reconstruction (MoDL), and a fully sampled reference. FIG. 4A-4C shows these results, where it can be observed that conventional iterative reconstruction (FIG. 4A) produces high aliasing artifacts and noise as a result of high accelerations and equi-spaced under-sampling pattern. In comparison to the DL result (FIG. 4B), the results from three refining approaches (FIG. 4D-4F) offer clearer images with better textures. VCC-SPIRiT (FIG. 4E) aesthetically produced the most noticeable refinement, with crisper features and textures, of the three approaches. The effect of different regularization factors (A) in the refinement is that decreasing the regularization causes the result to converge to DL reconstruction, while increasing the regularization produces aliasing artifacts and increased noise.

TABLE 1

Quantitative image quality assessment on the three test datasets (Knee PDw, Knee PD-FS, Brain T1-Post) and the two networks (MoDL, VarNet) for R = 4, R = 6. Average and standard deviation values of SSIM, PSNR (dB), and GMSD are reported. The higher the SSIM and PSNR, the better the image quality. The lower the GMSD, the better.

| Dataset | Model | 4× Acceleration | | | 6× Acceleration | | |
|---|---|---|---|---|---|---|---|
| | | SSIM ↑ | PSNR ↑ | GMSD ↓ | SSIM ↑ | PSNR ↑ | GMSD ↓ |
| Knee PDw | MoDL | 0.929 (0.035) | 38.2 (2.55) | 0.0174 (0.011) | 0.905 (0.041) | 36.4 (2.44) | 0.0270 (0.011) |
| | Refine | 0.935 (0.041) | 38.2 (2.78) | 0.0170 (0.013) | 0.915 (0.037) | 36.5 (2.49) | 0.0255 (0.012) |
| | VarNet | 0.921 (0.031) | 37.1 (2.52) | 0.0246 (0.014) | 0.901 (0.031) | 36.1 (2.44) | 0.0281 (0.010) |
| | Refine | 0.927 (0.032) | 37.5 (2.74) | 0.0212 (0.013) | 0.911 (0.035) | 36.3 (2.52) | 0.0267 (0.011) |
| Knee PD-FS | MoDL | 0.836 (0.034) | 34.5 (2.14) | 0.0217 (0.011) | 0.807 (0.056) | 33.4 (2.35) | 0.0321 (0.011) |
| | Refine | 0.834 (0.041) | 34.2 (2.31) | 0.0208 (0.012) | 0.815 (0.051) | 33.3 (2.42) | 0.0292 (0.013) |
| | VarNet | 0.831 (0.046) | 34.2 (2.22) | 0.0234 (0.013) | 0.805 (0.048) | 33.1 (2.15) | 0.0330 (0.012) |
| | Refine | 0.833 (0.052) | 33.5 (2.47) | 0.0215 (0.016) | 0.811 (0.051) | 33.1 (2.31) | 0.0307 (0.014) |
| Brain T1-Post | MoDL | 0.958 (0.010) | 41.8 (1.12) | 0.0099 (0.007) | 0.929 (0.013) | 37.8 (1.21) | 0.0273 (0.009) |
| | Refine | 0.970 (0.007) | 41.8 (0.99) | 0.0094 (0.008) | 0.944 (0.010) | 37.9 (1.28) | 0.0267 (0.010) |
| | VarNet | 0.951 (0.008) | 40.1 (0.94) | 0.0124 (0.005) | 0.931 (0.011) | 37.3 (1.19) | 0.0270 (0.009) |
| | Refine | 0.964 (0.005) | 40.3 (0.98) | 0.0115 (0.005) | 0.941 (0.012) | 37.8 (1.25) | 0.0255 (0.011) |

Effect of Refinement on Reconstructed Images

Figure 3A:
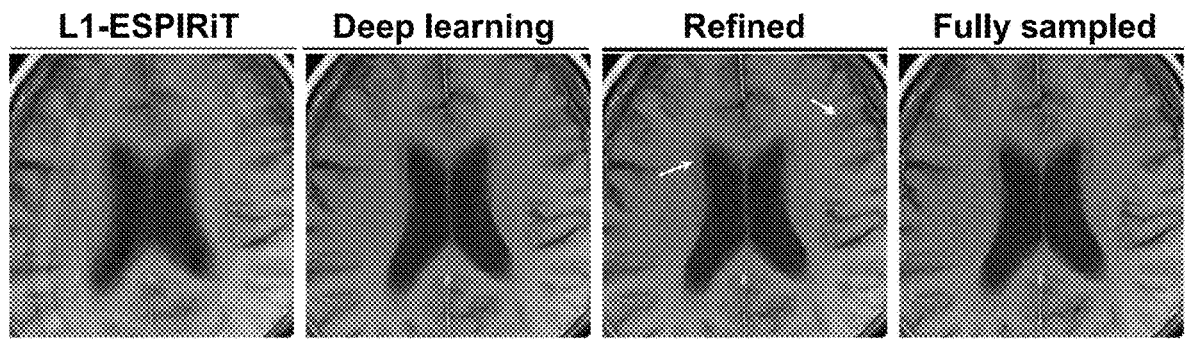
FIG. 3A, 3B, 3C show visualizations of results from R=6 accelerations. The first column demonstrates the reconstruction from zero-padded reconstruction, the second depicts the reconstructed results from Deep Learning (MoDL), the third column depicts results using the present refinement technique, and the fourth column depicts the fully sampled reference. Corresponding magnified images and error image (absolute difference with fully sampled image; ×10) are shown. As seen, refining results in crisper images with enhanced textures, and more evenly distributed error.
Figure 3B:
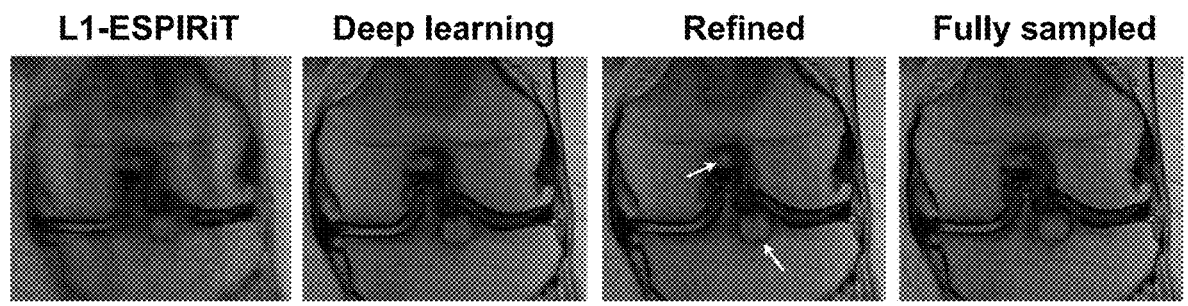
Figure 3C:
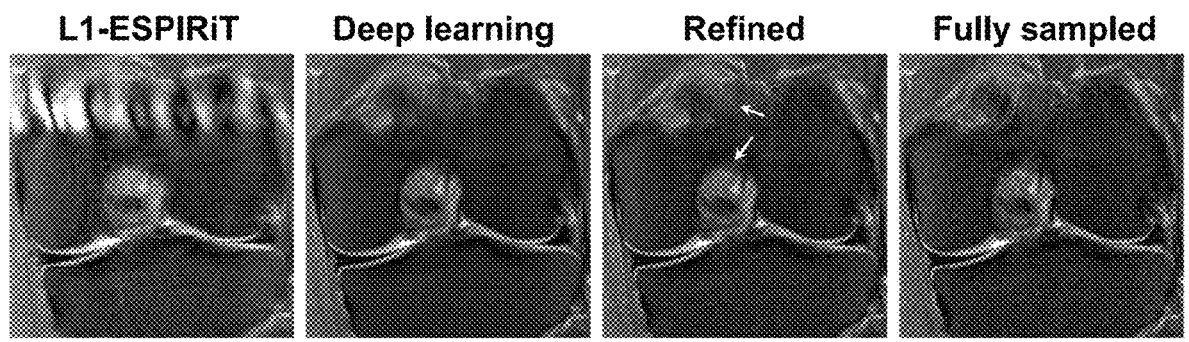

FIG. 3A, 3B, 3C illustrate the influence of the refinement technique on the final image. The final image was reconstructed by performing inverse Fourier Transform and coil Image Quality Assessment Measures for each of the three IQMs—i.e., SSIM, PSNR, and GMSD—are shown in Table 1 for the test dataset. For PSNR, the refined result achieves results that are comparable to those with DL without refinement. On the other hand, our method outperforms the metrics for SSIM and GMSD. This suggests that the refinement can effectively recover the details without sacrificing on the overall error.

DISCUSSION AND CONCLUSION

We have described a null-space-based refinement technique that may be easily added after DL reconstruction to enhance the quality and texture of a reconstructed image. Our findings imply that refining DL output using the present method may generally improve DL reconstruction as tested with various large-scale dataset and networks. Our method makes use of the constraint of k-space neighborhood consistency, which is may be easily extracted from the autocalibration lines collected during an MRI scan.

The present technique visually and quantitatively increases the high-frequency features of DL reconstructions for the three datasets. As can be seen in FIG. 3A, 3B, 3C, it generates clearer images and reduces high error in DL reconstruction, resulting in more evenly distributed error. The present technique is successful in improving high-frequency image details (SSIM, GMSD) without sacrificing overall image error (PSNR), as shown by the IQMs.

Here, we examined various null-space calibration methods for the study. By ensuring conjugate symmetry in k-space, VCC augmentation to SPIRiT (VCC-SPIRiT) can confine reconstruction to have slow varying phase and has demonstrated superior refinement compared to other approaches.

The invention claimed is:

1. A method for magnetic resonance imaging (MRI) comprising:
    a) acquiring under-sampled k-space measurements from an MRI apparatus using multiple receiver coils;
    b) reconstructing an MRI image from the under-sampled k-space measurements and coil sensitivity maps using an unrolled neural network;
    c) generating reconstructed multi-coil k-space data from the MRI image by multiplying the MRI image by the coil sensitivity maps followed by performing a Fourier transform;
    d) estimating a k-space null-space convolutional kernel from fully-sampled k-space measurements in autocalibration signal lines of the under-sampled k-space measurements;
    e) solving a convex optimization problem to produce refined k-space data from the k-space null-space kernel, the under-sampled k-space measurements, and the reconstructed multi-coil k-space data;
    f) producing a refined MRI image from the refined k-space data by performing an inverse Fourier transform followed by a coil combination using the coil sensitivity maps.

2. The method of claim 1 wherein estimating the k-space null-space kernel comprises performing a virtual coil augmentation, coil compression, and solving a constrained optimization problem.

3. The method of claim 1 wherein solving the convex optimization problem to produce the refined k-space data from the k-space null-space kernel comprises performing a conjugate gradient (CG) algorithm.

* * * * *